(12) United States Patent
Garey et al.

(10) Patent No.: US 8,842,259 B2
(45) Date of Patent: Sep. 23, 2014

(54) LASER TRACKER WITH ENHANCED HANDLING FEATURES

(75) Inventors: Jeremy M. Garey, Landenberg, PA (US); Jonathan Robert Day, Wilmington, DE (US); Kenneth Steffey, Longwood, FL (US); James K. West, Landenberg, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 232 days.

(21) Appl. No.: 13/446,211

(22) Filed: Apr. 13, 2012

(65) Prior Publication Data

US 2012/0262694 A1 Oct. 18, 2012

Related U.S. Application Data

(63) Continuation-in-part of application No. 29/413,811, filed on Feb. 21, 2012, now Pat. No. Des. 688,577.

(60) Provisional application No. 61/592,049, filed on Jan. 30, 2012, provisional application No. 61/475,703, filed on Apr. 15, 2011.

(51) Int. Cl.
| | |
|---|---|
| G01S 7/481 | (2006.01) |
| G01C 3/08 | (2006.01) |
| G01C 15/00 | (2006.01) |
| G01S 7/48 | (2006.01) |
| G01S 7/491 | (2006.01) |
| G01S 17/42 | (2006.01) |
| G01S 17/66 | (2006.01) |
| G01S 17/89 | (2006.01) |

(52) U.S. Cl.
CPC ............... *G01S 7/4818* (2013.01); *G01C 3/08* (2013.01); *G01C 15/002* (2013.01); *G01S 7/4808* (2013.01); *G01S 7/4813* (2013.01); *G01S 7/491* (2013.01); *G01S 17/42* (2013.01); *G01S 17/66* (2013.01); *G01S 17/89* (2013.01)

USPC ......... 356/3.11; 356/3.01; 356/3.1; 356/4.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | |
|---|---|---|
| 2,682,804 A | 7/1954 | Clifford et al. |
| 2,784,641 A | 3/1957 | Keuffel et al. |

(Continued)

FOREIGN PATENT DOCUMENTS

| | | |
|---|---|---|
| CN | 1531659 A | 9/2004 |
| CN | 101031817 A | 9/2007 |

(Continued)

OTHER PUBLICATIONS

International Search Report of the International Searching Authority for Application No. PCT/US2012/034611; Date of Mailing Dec. 13, 2012.

(Continued)

*Primary Examiner* — Luke Ratcliffe
(74) *Attorney, Agent, or Firm* — Cantor Colburn LLP

(57) ABSTRACT

A coordinate measurement device sends a first light beam to a target which returns a portion as a second beam. The device includes: first and second motors that direct the first beam to a first direction determined by a first angle of rotation about a first axis and a second angle of rotation about a second axis, the first and second angles of rotation produced by the first and second motors, respectively; first and second angle measuring devices that measure first and second angles of rotation, respectively; a distance meter that measures a first distance from the device to the target based in part on a first portion of the second beam; a processor that provides a 3D coordinate of the target based in part on the first distance and the first and second angles of rotation; and a retractable handle at the device top side.

18 Claims, 17 Drawing Sheets

(56) References Cited

U.S. PATENT DOCUMENTS

| | | |
|---|---|---|
| 3,339,457 A | 9/1967 | Pun |
| 3,365,717 A | 1/1968 | Holscher |
| 3,464,770 A | 9/1969 | Schmidt |
| 3,497,695 A | 2/1970 | Smith et al. |
| 3,508,828 A | 4/1970 | Froome et al. |
| 3,619,058 A | 11/1971 | Hewlett et al. |
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,297,030 A | 10/1981 | Chaborski |
| 4,403,857 A | 9/1983 | Holscher |
| 4,453,825 A | 6/1984 | Buck et al. |
| 4,498,764 A | 2/1985 | Bolkow et al. |
| 4,531,833 A | 7/1985 | Ohtomo |
| 4,632,547 A | 12/1986 | Kaplan et al. |
| 4,689,489 A | 8/1987 | Cole |
| 4,692,023 A | 9/1987 | Ohtomo et al. |
| 4,699,508 A | 10/1987 | Bolkow et al. |
| 4,707,129 A | 11/1987 | Hashimoto et al. |
| 4,714,339 A | 12/1987 | Lau et al. |
| 4,790,651 A | 12/1988 | Brown et al. |
| 5,002,388 A | 3/1991 | Ohishi et al. |
| 5,051,934 A | 9/1991 | Wiklund |
| 5,082,364 A | 1/1992 | Russell |
| 5,162,862 A | 11/1992 | Bartram et al. |
| 5,319,434 A | 6/1994 | Croteau et al. |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,455,670 A | 10/1995 | Payne et al. |
| 5,534,992 A | 7/1996 | Takeshima et al. |
| 5,737,068 A | 4/1998 | Kaneko et al. |
| 5,742,379 A | 4/1998 | Reifer |
| 5,754,284 A | 5/1998 | Leblanc et al. |
| 5,764,360 A | 6/1998 | Meier |
| 5,771,623 A | 6/1998 | Pernstich et al. |
| 5,880,822 A | 3/1999 | Kubo |
| 5,886,777 A | 3/1999 | Hirunuma |
| 5,892,575 A | 4/1999 | Marino |
| 5,991,011 A | 11/1999 | Damm |
| 6,017,125 A | 1/2000 | Vann |
| D427,087 S | 6/2000 | Kaneko et al. |
| 6,100,540 A | 8/2000 | Ducharme et al. |
| 6,324,024 B1 | 11/2001 | Shirai et al. |
| 6,330,379 B1 | 12/2001 | Hendriksen |
| 6,351,483 B1 | 2/2002 | Chen |
| 6,369,880 B1 | 4/2002 | Steinlechner |
| 6,437,859 B1 | 8/2002 | Ohtomo et al. |
| 6,463,393 B1 | 10/2002 | Giger |
| 6,490,027 B1 | 12/2002 | Rajchel et al. |
| 6,563,569 B2 | 5/2003 | Osawa et al. |
| 6,583,862 B1 | 6/2003 | Perger |
| 6,633,367 B2 | 10/2003 | Gogolla |
| 6,727,985 B2 | 4/2004 | Giger |
| 6,765,653 B2 | 7/2004 | Shirai et al. |
| 6,847,436 B2 | 1/2005 | Bridges |
| 6,859,744 B2 | 2/2005 | Giger |
| 6,864,966 B2 | 3/2005 | Giger |
| 7,023,531 B2 | 4/2006 | Gogolla et al. |
| 7,095,490 B2 | 8/2006 | Ohtomo et al. |
| 7,099,000 B2 * | 8/2006 | Connolly .................. 356/139.1 |
| 7,177,014 B2 | 2/2007 | Mori et al. |
| 7,196,776 B2 | 3/2007 | Ohtomo et al. |
| 7,224,444 B2 | 5/2007 | Stierle et al. |
| 7,248,374 B2 | 7/2007 | Bridges |
| 7,256,899 B1 | 8/2007 | Faul et al. |
| 7,262,863 B2 | 8/2007 | Schmidt et al. |
| 7,327,446 B2 | 2/2008 | Cramer et al. |
| 7,336,346 B2 | 2/2008 | Aoki et al. |
| 7,339,655 B2 | 3/2008 | Nakamura et al. |
| 7,352,446 B2 | 4/2008 | Bridges et al. |
| 7,372,558 B2 | 5/2008 | Kaufman et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,511,824 B2 | 3/2009 | Sebastian et al. |
| 7,518,709 B2 | 4/2009 | Oishi et al. |
| 7,535,555 B2 | 5/2009 | Nishizawa et al. |
| 7,586,586 B2 | 9/2009 | Constantikes |
| D605,959 S | 12/2009 | Apotheloz |
| 7,701,559 B2 | 4/2010 | Bridges et al. |
| 7,738,083 B2 | 6/2010 | Luo et al. |
| 7,751,654 B2 | 7/2010 | Lipson et al. |
| 7,800,758 B1 | 9/2010 | Bridges et al. |
| 7,804,602 B2 | 9/2010 | Raab |
| D629,314 S | 12/2010 | Ogasawara |
| 7,929,150 B1 | 4/2011 | Schweiger |
| 7,990,523 B2 | 8/2011 | Schlierbach et al. |
| 8,087,315 B2 | 1/2012 | Goossen et al. |
| 8,314,939 B2 | 11/2012 | Kato |
| 2002/0093646 A1 | 7/2002 | Muraoka et al. |
| 2003/0133092 A1 | 7/2003 | Rogers |
| 2004/0075823 A1 | 4/2004 | Lewis et al. |
| 2005/0147477 A1 | 7/2005 | Clark |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0145703 A1 | 7/2006 | Steinbichler et al. |
| 2006/0222237 A1 | 10/2006 | Du et al. |
| 2007/0016386 A1 | 1/2007 | Husted |
| 2007/0024842 A1 | 2/2007 | Nishizawa et al. |
| 2007/0121095 A1 | 5/2007 | Lewis |
| 2007/0127013 A1* | 6/2007 | Hertzman et al. ......... 356/141.1 |
| 2007/0130785 A1 | 6/2007 | Bublitz et al. |
| 2007/0247615 A1 | 10/2007 | Bridges |
| 2008/0239281 A1 | 10/2008 | Bridges |
| 2008/0316497 A1 | 12/2008 | Taketomi et al. |
| 2008/0316503 A1 | 12/2008 | Smarsh et al. |
| 2009/0009747 A1 | 1/2009 | Wolf et al. |
| 2009/0046271 A1 | 2/2009 | Constantikes |
| 2009/0066932 A1 | 3/2009 | Bridges et al. |
| 2010/0058252 A1 | 3/2010 | Ko |
| 2010/0128259 A1 | 5/2010 | Bridges et al. |
| 2010/0176270 A1 | 7/2010 | Lau et al. |
| 2010/0207938 A1 | 8/2010 | Yau et al. |
| 2010/0245851 A1 | 9/2010 | Teodorescu |
| 2010/0250175 A1 | 9/2010 | Briggs et al. |
| 2010/0277747 A1 | 11/2010 | Rueb et al. |
| 2011/0032509 A1 | 2/2011 | Bridges |
| 2011/0069322 A1 | 3/2011 | Hoffer, Jr. |
| 2011/0109502 A1* | 5/2011 | Sullivan .................. 342/357.25 |
| 2011/0173827 A1 | 7/2011 | Bailey et al. |
| 2011/0175745 A1 | 7/2011 | Atwell et al. |
| 2012/0262728 A1 | 10/2012 | Bridges et al. |

FOREIGN PATENT DOCUMENTS

| | | |
|---|---|---|
| DE | 3827458 A1 | 2/1990 |
| DE | 202006020299 U1 | 5/2008 |
| EP | 0166106 | 1/1986 |
| EP | 1067363 A2 | 1/2001 |
| EP | 1607767 A1 | 12/2005 |
| EP | 2177868 A2 | 10/2009 |
| EP | 2259010 A1 | 12/2010 |
| EP | 2259013 A1 | 12/2010 |
| JP | 57147800 | 9/1982 |
| JP | 5804881 | 3/1983 |
| JP | 2184788 | 7/1990 |
| JP | 5302976 | 11/1993 |
| JP | 6097288 | 4/1994 |
| JP | 11337642 | 12/1999 |
| JP | 2000275042 A | 10/2000 |
| JP | 2001272468 | 10/2001 |

(56) References Cited

FOREIGN PATENT DOCUMENTS

| JP | 2002098762 | | 4/2002 |
|----|------------|----|--------|
| JP | 2004527751 | | 9/2004 |
| JP | 2008514967 | | 5/2008 |
| WO | 0177613 | A1 | 10/2001 |
| WO | 02084327 | | 10/2002 |
| WO | 2003062744 | A1 | 7/2003 |
| WO | 2004063668 | | 7/2004 |
| WO | 2007084209 | A2 | 7/2007 |
| WO | 2008052348 | A1 | 5/2008 |
| WO | 2008119073 | A2 | 10/2008 |
| WO | 2010141120 | A2 | 12/2010 |
| WO | 2010148525 | A1 | 12/2010 |

OTHER PUBLICATIONS

Written Opinion of the International Searching Authority for Application No. PCT/US2012/034611; Date of Mailing Dec. 13, 2012.
Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131, the whole document.
International Search Report of the International Searching Authority for Application No. PCT/US2012/030835; Date of Mailing Jul. 23, 2012.
International Search Report of the International Searching Authority for Application No. PCT/US2012/031368; Date of Mailing Jul. 18, 2012.
International Search Report of the International Searching Authority for PCT/US2012/032715; Date of Mailing Jul. 5, 2012.
International Search Report of the International Searching Authority for Application No. PCT/US2012/033477; Date of Mailing Jul. 20, 2012.
Leica Laser Tracker System, Leica Geosystems AG, Jan. 1, 1999, XP002678836, Retrieved from the Internet: URL:http://www.a-solution.com.au/pages/downloads/LTD500_Brochure_EN.pdf [retrieved on 2012] the whole document.
Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517, the whole document.
Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2002, pp. S356-S363, XP020080997, ISSN: 1464-4258, DOI: 10.1088/1464-4258/4/6/380, the whole document.
Written Opinion of the International Searching Authority for PCT/US2012/032715; Date of Mailing Jul. 5, 2012.
Written Opinion of the International Searching Authority for Application No. PCT/US2012/030835; Date of Mailing Jul. 23, 2012.
Written Opinion of the International Searching Authority for Application No. PCT/US2012/031368; Date of Mailing Jul. 18, 2012.
Written Opinion of the International Searching Authority for Application No. PCT/US2012/033477; Date of Mailing Jul. 20, 2012.
International Search Report of the International Searching Authority for Application No. PCT/2012/030225; Date of Mailing Sep. 28, 2012.
International Search Report of the International Searching Authority for Application No. PCT/US2012/032971; Date of Mailing Sep. 3, 2012.
International Search Report of the International Searching Authority for Application No. PCT/US2012/0033435; Date of Mailing Sep. 17, 2012.
International Search Report of the International Seracrhing Aurhority for Application No. PCT/YS2012/033720; Date of Mailing Sep. 26, 2012.
Written Opinion of the International Searching Authority for Application No. PCT/US2012/030225; Date of Mailing Sep. 28, 2012.
Written Opinion of the International Searching Authority for Application No. PCT/US2012/032971; Date of Mailing Sep. 3, 2012.
Written Opinion of the International Searching Authority for Application No. PCT/US2012/033435; Date of Mailing Sep. 17, 2012.
Written Opinion of the International Searching Authority for Application No. PCT/US2012/033720; Date of Mailing Sep. 26, 2012.
International Search Report of the International Searching Authority for Application No. PCT/US2012/032970; Date of Mailing Nov. 28, 2012.
International Search Report of the International Searching Authority for Application No. PCT/US2012/032972; Date of Mailing Nov. 28, 2012.
International Search Report of the International Searching Authority for Application No. PCT/US2012/032990; Date of Mailing Dec. 4, 2012.
Written Opinion of the International Searching Authority for Application No. PCT/US2012/032970; Date of Mailing Nov. 28, 2012.
Written Opinion of the International Searching Authority for Application No. PCT/US2012/032972; Date of Mailing Nov. 28, 2012.
Written Opinion of the International Searching Authority for Application No. PCT/US2012/032990; Date of Mailing Dec. 4, 2012.
Japanese Patent Application No. 2010-176909 filed Aug. 6, 2010; issued on Oct. 23, 2012.
Chinese Office Action issued Sep. 22, 2013 for Patent Application No. 201010251189.3.
International Preliminary Report on Patentability for International Application Serial No. PCT/US2012/030225. International filing date Mar. 23, 2012. Date of Issuance Oct. 15, 2013.
International Preliminary Report on Patentability for International Application Serial No. PCT/US2012/030835. International filing date Mar. 28, 2012. Date of Issuance Oct. 15, 2013.
International Preliminary Report on Patentability for International Application Serial No. PCT/US2012/032715. International filing date Apr. 9, 2012. Date of Issuance Oct. 15, 2013.
International Preliminary Report on Patentability for International Application Serial No. PCT/US2012/032970. International filing date Apr. 11, 2012. Date of Issuance Oct. 15, 2013.
International Preliminary Report on Patentability for International Application Serial No. PCT/US2012/032971. International filing date Apr. 11, 2012. Date of Issuance Oct. 15, 2013.
International Preliminary Report on Patentability for International Application Serial No. PCT/US2012/032972. International filing date Apr. 11, 2012. Date of Issuance Oct. 15, 2013.
International Preliminary Report on Patentability for International Application Serial No. PCT/US2012/032990. International filing date Apr. 11, 2012. Date of Issuance Oct. 15, 2013.
International Preliminary Report on Patentability for International Application Serial No. PCT/US2012/033435. International filing date Apr. 13, 2012. Date of Issuance Oct. 15, 2013.
International Preliminary Report on Patentability for International Application Serial No. PCT/US2012/033477. International filing date Apr. 13, 2012. Date of Issuance Oct. 15, 2013.
International Preliminary Report on Patentability for International Application Serial No. PCT/US2012/033720. International filing date Apr. 16, 2012. Date of Issuance Oct. 15, 2013.
International Preliminary Report on Patentability for International Application Serial No. PCT/US2012/031368. International filing date Mar. 30, 2012. Date of Issuance Oct. 15, 2013.
Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8, 2006.
Chinese Search Report for Chinese Application No. 201010251189; Dated Sep. 10, 2013.
Office Action for Japanese Patent Application No. 2010-176909 filed Aug. 6, 2010; issued on Mar. 19, 2013.
Optical Circulator (3-Ports & 4-Ports); [on-line technical data sheet]; Alliance Fiber Optic Products, Inc. REV.D Jan. 15, 2004; Retrieved from www.afop.com.
Super-Nyquist Operation of the AD9912 Yields a High RF Output Signal; Analog Devices, Inc., AN-939 Application Note; www.analog.com; Copyright 2007.

(56) References Cited

OTHER PUBLICATIONS

Nanona High Speed & Low Loss Optical Switch; [on-line technical data sheet]; [Retrieved Oct. 14, 2010]; Retrieved from http://www.bostonati.com/products/PI-FOS.pdf.

Making the Big Step from Electronics to Photonics by Modulating a Beam of Light with Electricity; May 18, 2005; [on-line]; [Retrieved May 7, 2009]; Cornell University News Service; Retrieved from http://www.news.cornell.edu/stories/May05/LipsonElectroOptical.ws.html.

EOSpace—High-Speed Switches; [on-line technical brochure]; [Retrieved May 18, 2009]; Retrieved from http://www.cospace.com/Switches.htm.

FARO Laser Tracker ION; 2 pages; revised Apr. 23, 2010; FARO Technologies, Inc., www.lasertracker.faro.com.

Great Britain Search Report for Application No. GB1013200.9 dated Nov. 22, 2010.

AO Modulator-M040-8J-FxS; [online-technical data sheet]; Gooch & Housego; Nov. 2006; Retrieved from http://www.goochandhousego.com/.

2x2 High Speed Lithium Niobate Interferometric Switch; [on-line]; JDS Uniphase Corporation; 2007; Retrieved from www.jdsu.com.

Integrated Optical Amplitude Modulator; [on-line technical data sheet]; [Retrieved Oct. 14, 2010]; Jenoptik; Retrieved from http://www.jenoptik.com/cms/products.nsf/0/A6DF20B50AEE7819C12576FE0074E8E6/$File/amplitudemodulators_en.pdf?Open.

Kester, Walt, Practical Analog Design Techniques, Analog Devices, Section 5, Undersampling Applications, Copyright 1995, pp. 5-1 to 5-34.

Optical Circulators Improve Bidirectional Fiber Systems; by Jay S. Van Delden; [online]; [Retrieved May 18, 2009]; Laser Focus World; Retrieved from http://www.laserfocusworld.com/display_article/28411/12/nonc/nonc/News/Optical-circulators-improve-bidirectional-fiber-systems.

Leica Absolute Tracker AT401-ASME B89.4.19-2006 Specifications; Hexagon Metrology; Leica Geosystems Metrology Products, Switzerland; 2 pages; www.leica-geosystems.com/metrology.

Lightvision—High Speed Variable Optical Attenuators (VOA); [on-line]; A publication of Lightwaves 2020, Feb. 1, 2008; Retrieved from http://www.lightwaves2020.com/home/.

LaserTRACER-measuring sub-micron in space; http://www.etalon-ag.com/index.php/en/products/lasertracer; 4 pages; Jun. 28, 2011; ETALON AG.

Computer Giants Embrace On-Chip Optics; Mar. 27, 2008; [on-line]; Optics.org; [Retrieved on Apr. 2, 2008]; Retrieved from http://optics.org/cws/article/research/33521.

MEMS Variable Optical Attenuators Single/Multi-Channel; [on-line]; Jan. 17, 2005; Retrieved from www.ozoptics.com.

PCMM System Specifications Leica Absolute Tracker and Leica T-Products; Hexagon Metrology; Leica Geosystems Metrology Products, Switzerland; 8 pages; www.leica-geosystems.com/metrology, No date.

Poujouly, Stephane, et al., Digital Laser Range Finder: Phase-Shift Estimation by Undersampling Technique; IEEE, Copyright 1999.

RS Series Remote Controlled Optical Switch; [on-line technical data sheet]; Sercalo Microtechnology, Ltd. [Retrieved Oct. 14, 2010]; Retrieved from http://www.sercalo.com/document/PDFs/DataSheets/RS%20datasheet.pdf.

Tracker3; Ultra-Portable Laser Tracking System; 4 pages; 2010 Automated Precision Inc.; www.apisensor.com.

JP Office Action for Application No. 2014-505151 issued Apr. 30, 2014.

DE Office Action for Application No. 102010038955.2 issued Apr. 23, 2014.

\* cited by examiner

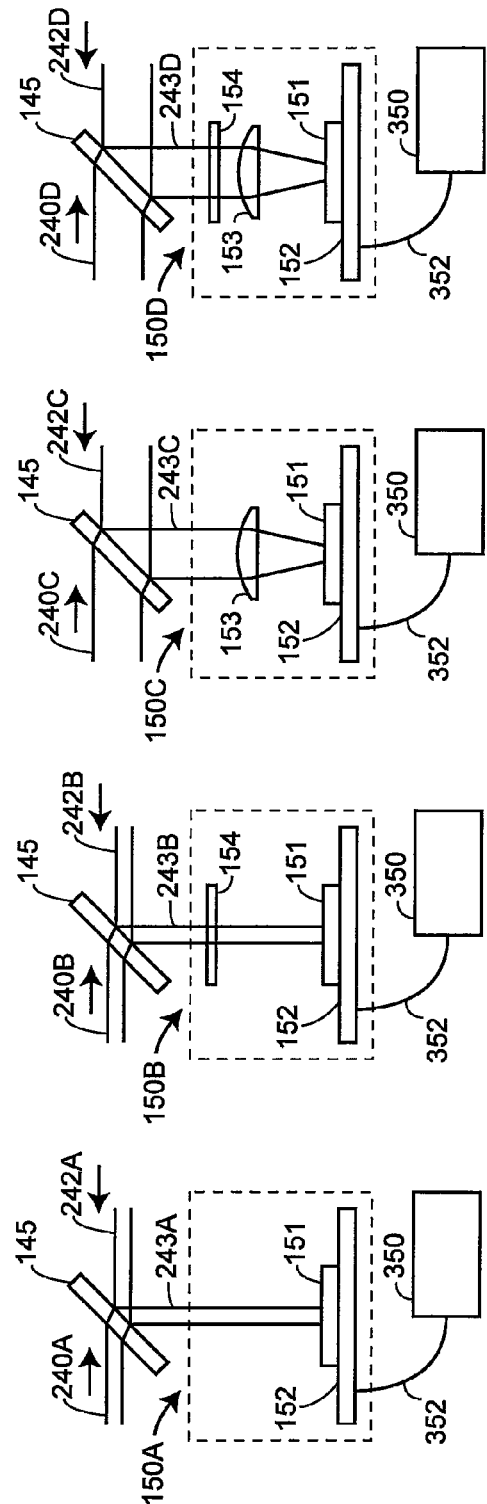

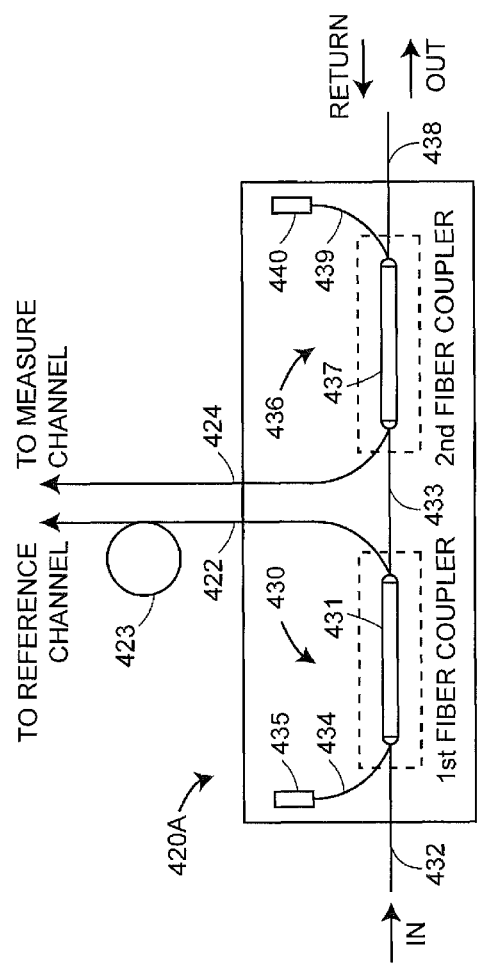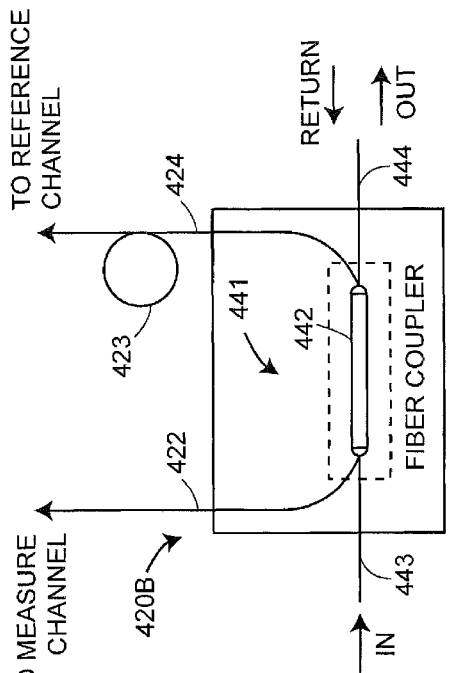
PRIOR ART
FIGURE 8A
PRIOR ART
FIGURE 8B

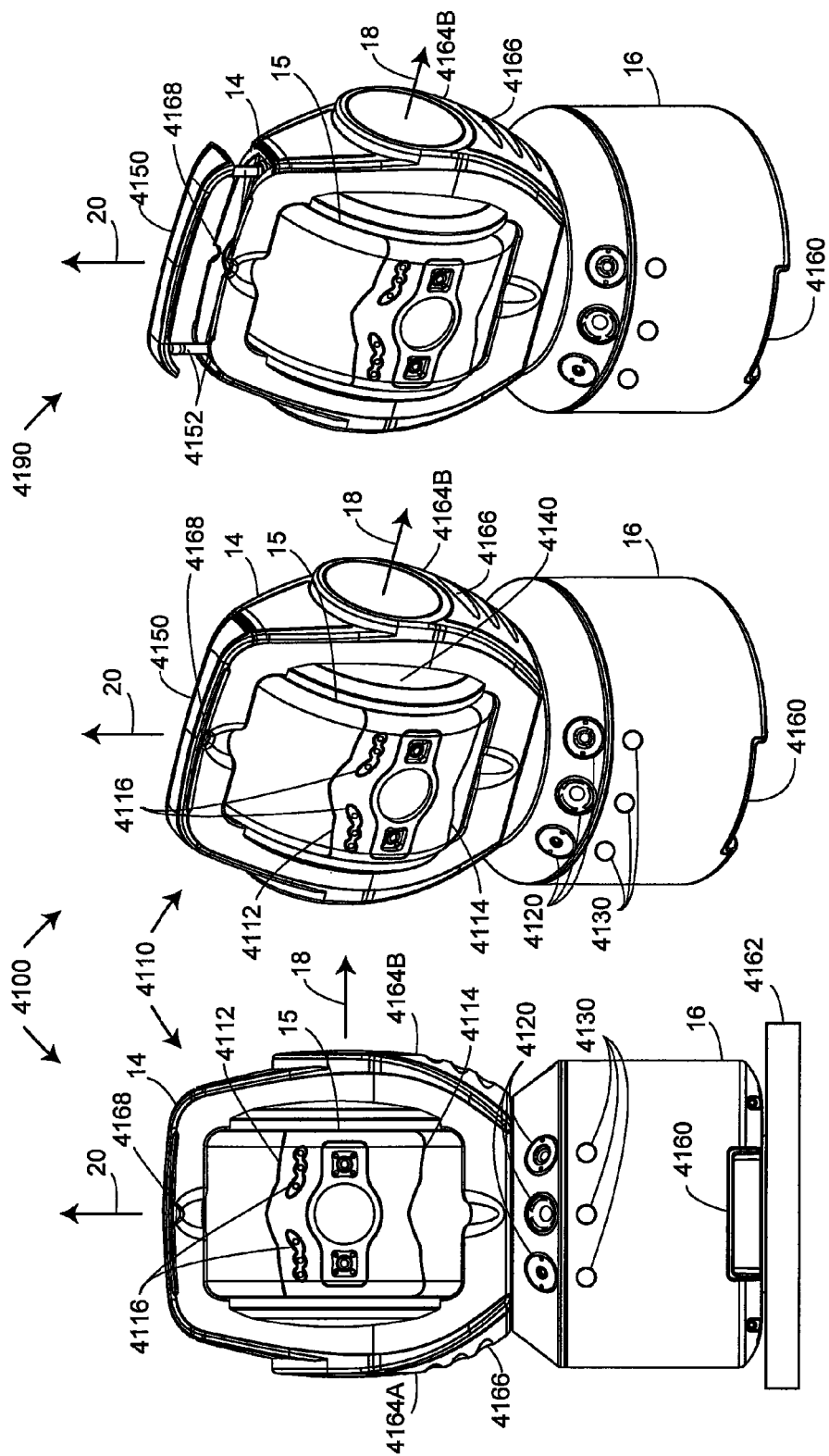

LASER TRACKER WITH ENHANCED HANDLING FEATURES

CROSS REFERENCE TO RELATED APPLICATIONS

The present application claims the benefit of U.S. Provisional Patent Application No. 61/592,049 filed Jan. 30, 2012, and U.S. Provisional Patent Application No. 61/475,703 filed Apr. 15, 2011, the entire contents of both of which are hereby incorporated by reference. The present application is also a continuation-in-part of U.S. Design Pat. application No. 29/413,811, filed Feb. 21, 2012, the entire contents of which are hereby incorporated by reference.

BACKGROUND

The present disclosure relates to a coordinate measuring device. One set of coordinate measurement devices belongs to a class of instruments that measure the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. Coordinate-measuring devices closely related to the laser tracker are the laser scanner and the total station. The laser scanner steps one or more laser beams to points on a surface. It picks up light scattered from the surface and from this light determines the distance and two angles to each point. The total station, which is most often used in surveying applications, may be used to measure the coordinates of diffusely scattering or retroreflective targets. Hereinafter, the term laser tracker is used in a broad sense to include laser scanners and total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are herein incorporated by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest. The gimbal mechanism used for a laser tracker may be used for a variety of other applications. As a simple example, the laser tracker may be used in a gimbal steering device having a visible pointer beam but no distance meter to steer a light beam to series of retroreflector targets and measure the angles of each of the targets.

Angle measuring devices such as angular encoders are attached to the mechanical axes of the tracker. The one distance measurement and two angle measurements performed by the laser tracker are sufficient to completely specify the three-dimensional location of the SMR.

Several laser trackers are available or have been proposed for measuring six, rather than the ordinary three, degrees of freedom. Exemplary six degree-of-freedom (six-DOF) systems are described by U.S. Pat. No. 7,800,758 ('758) to Bridges et al., the contents of which are herein incorporated by reference, and U.S. Published Patent Application No. 2010/0128259 to Bridges et al., the contents of which are herein incorporated by reference.

Previously, laser trackers have not provided optimum means for lifting and transporting. Better features are needed for lifting and transporting laser trackers.

SUMMARY

According to an embodiment of the present invention, a coordinate measurement device sends a first beam of light to a remote target point, the target point returning a portion of the first beam as a second beam, the coordinate measurement device having a top side, a bottom side, and a weight. The measurement device includes: a first motor and a second motor that together direct the first beam of light to a first direction, the first direction determined by a first angle of rotation about a first axis and a second angle of rotation about a second axis, the first angle of rotation produced by the first motor and the second angle of rotation produced by the second motor. The measurement device also includes: a first angle measuring device that measures the first angle of rotation and a second angle measuring device that measures the second angle of rotation; a distance meter that measures a first distance from the coordinate measurement device to the target point based at least in part on a first portion of the second beam received by a first optical detector; and a processor that provides a three-dimensional coordinate of the target point, the three-dimensional coordinate based at least in part on the first distance, the first angle of rotation, and the second angle of rotation; and a retractable handle located at the top side.

According to another embodiment of the present invention, a coordinate measurement device sends a first beam of light to a remote target point, the target point returning a portion of the first beam as a second beam, the coordinate measurement device having a top side and a bottom side. The measurement device includes: a first motor and a second motor that together direct the first beam of light to a first direction, the first direction determined by a first angle of rotation about a first axis and a second angle of rotation about a second axis, the first angle of rotation produced by the first motor and the second angle of rotation produced by the second motor. The measurement device also includes: a first angle measuring device that measures the first angle of rotation and a second angle measuring device that measures the second angle of rotation; a distance meter that measures a first distance from the coordinate measurement device to the target point based at least in part on a first portion of the second beam received by a first optical detector; a processor that provides a three-dimensional coordinate of the target point, the three-dimensional coordinate based at least in part on the first distance, the first angle of rotation, and the second angle of rotation; and a recessed grip on the bottom side, the recessed grip being an indentation large enough to permit fingers to be inserted into the indentation.

According to another embodiment of the present invention, a coordinate measurement device sends a first beam of light to a remote target point, the target point returning a portion of the first beam as a second beam, the coordinate measurement device having a top side and a bottom side. The measurement device includes: a first motor and a second motor that together direct the first beam of light to a first direction, the first direction determined by a first angle of rotation about a first axis and a second angle of rotation about a second axis, the first angle of rotation produced by the first motor and the second angle of rotation produced by the second motor. The measurement device also includes: a first angle measuring device that measures the first angle of rotation and a second angle measuring device that measures the second angle of rotation; a distance meter that measures a first distance from the coordinate measurement device to the target point based at least in part on a first portion of the second beam received by a first optical detector; a processor that provides a three-dimensional coordinate of the target point, the three-dimensional coordinate based at least in part on the first distance, the first angle of rotation, and the second angle of rotation; and a side grip pair, the side grip pair including a first side grip and a second side grip, the first side grip located opposite the second side grip on a side of the coordinate measurement device, the first side grip and the second side grip being located at positions intermediate between the top side and the bottom side, the side grip pair configured to be gripped by a pair of hands.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 4, which includes

FIG. 6A-D are schematic figures that show four types of prior art position detector assemblies;

FIGS. 8A and 8B are schematic figures showing fiber-optic elements within a prior art fiber-optic network;

FIGS. 14A, 14B, and 14C show front, perspective, and perspective views, respectively, of a laser tracker having useful features according to embodiments of the present invention.

DETAILED DESCRIPTION

Figure 1:
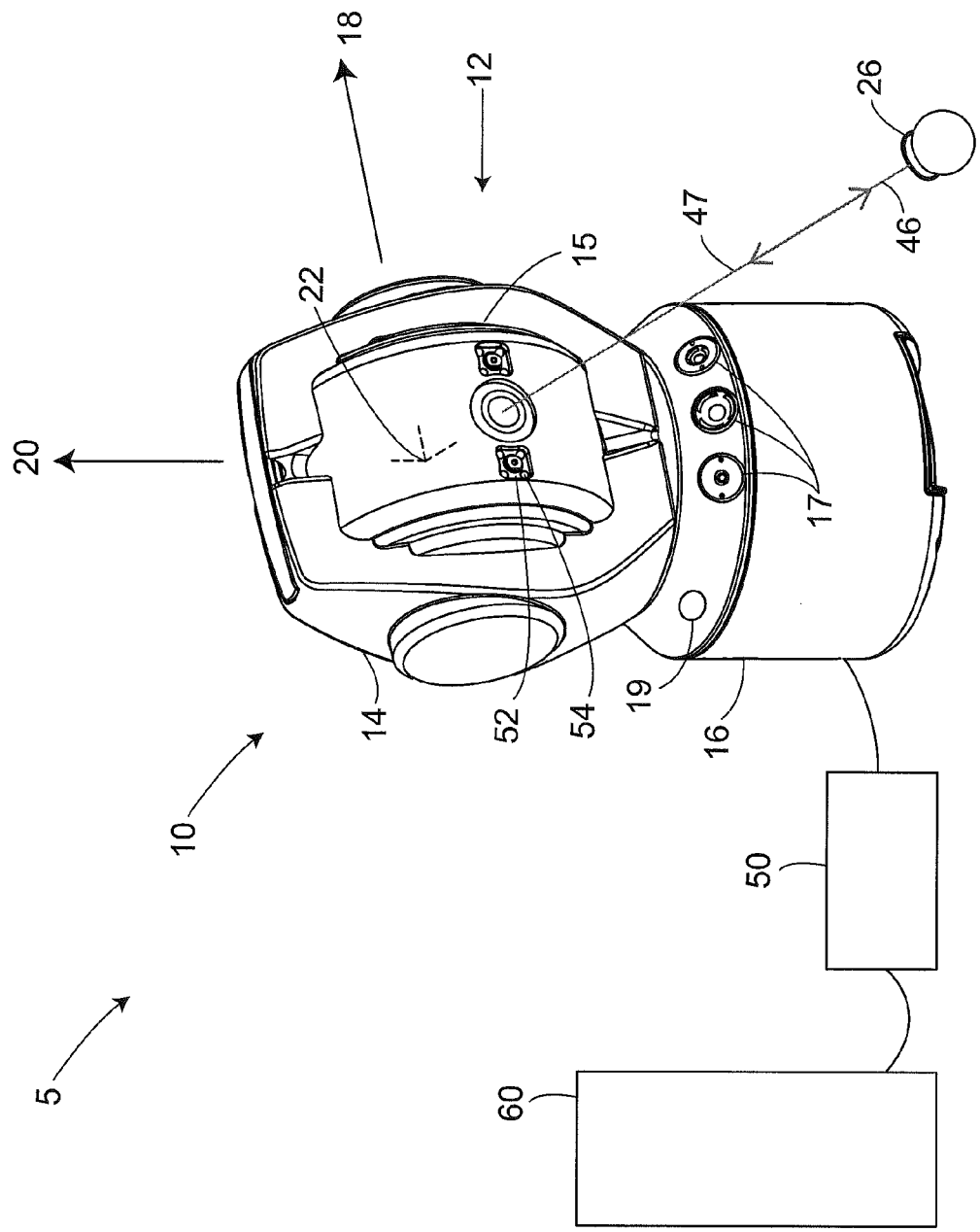
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 lies in a plane approximately perpendicular to the zenith axis 18 and that passes through the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, 7/8, and 1/2 inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446, the contents of which are incorporated by reference.

Figure 2:
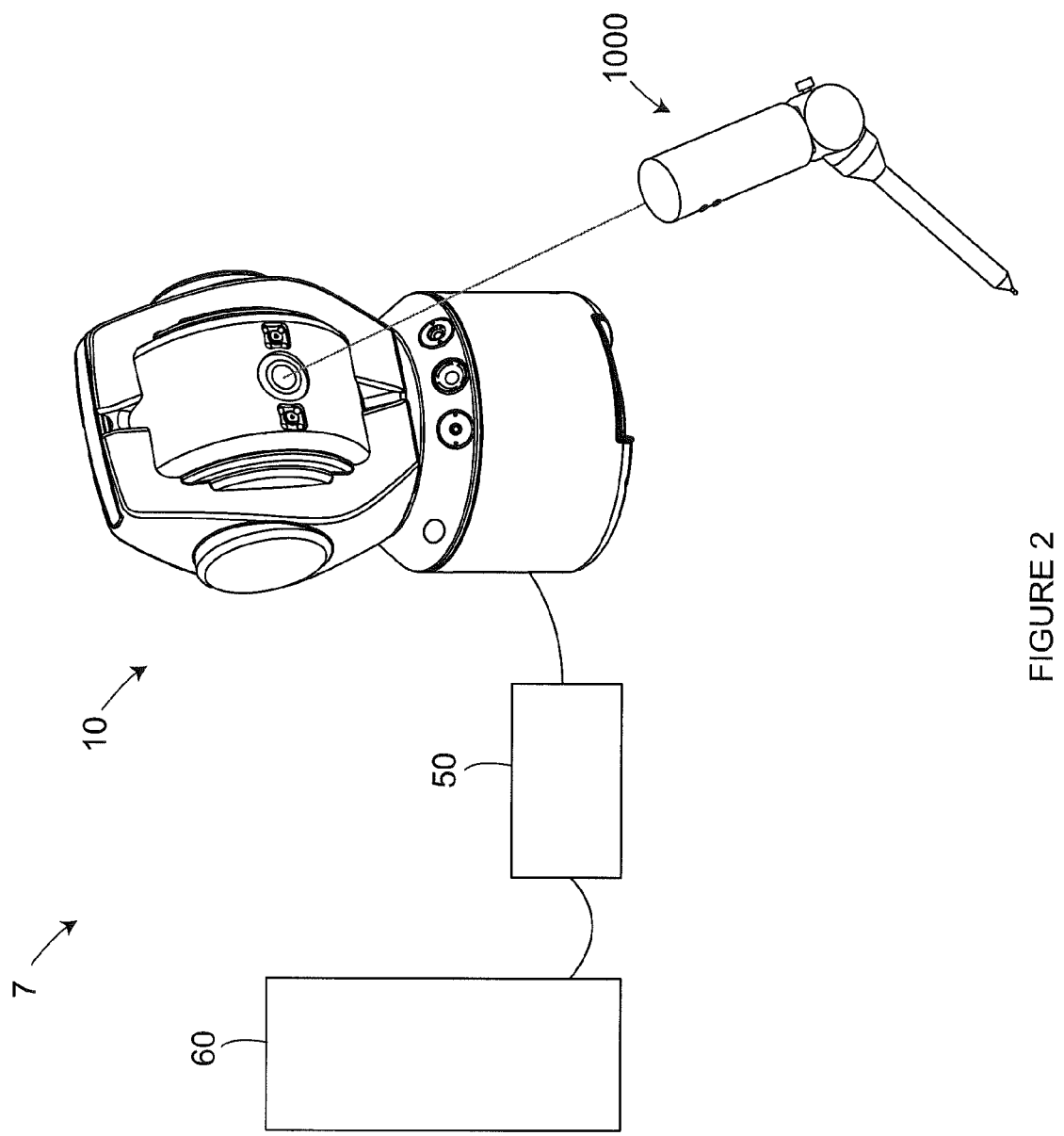
FIG. 2 is a perspective view of a laser tracker system with a six-DOF target in accordance with an embodiment of the present invention.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
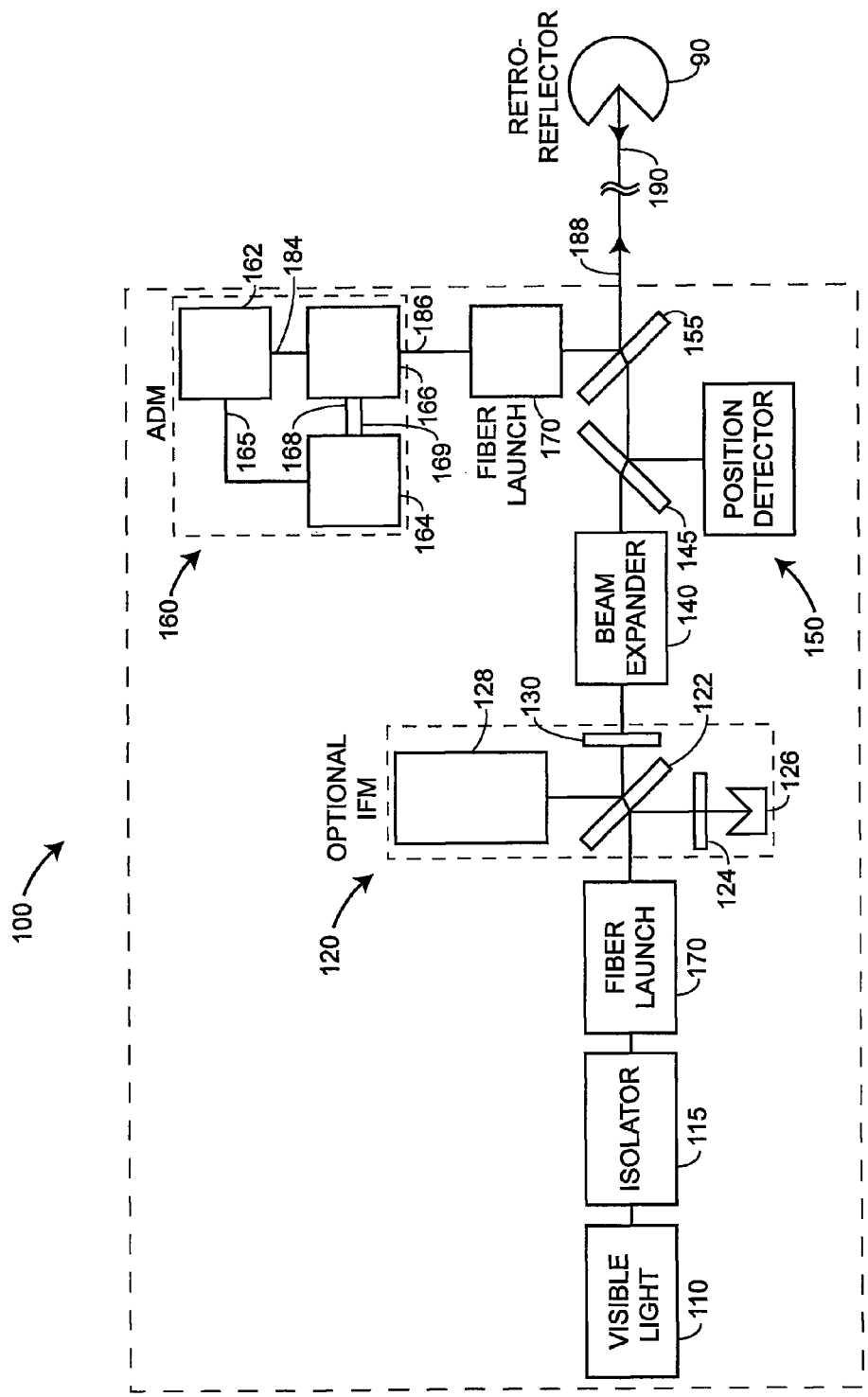
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional interferometer (IFM) 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that reflects back into the light source. Optional IFM may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed herein below with reference to FIG. 5.

Figures 4A, 4B:
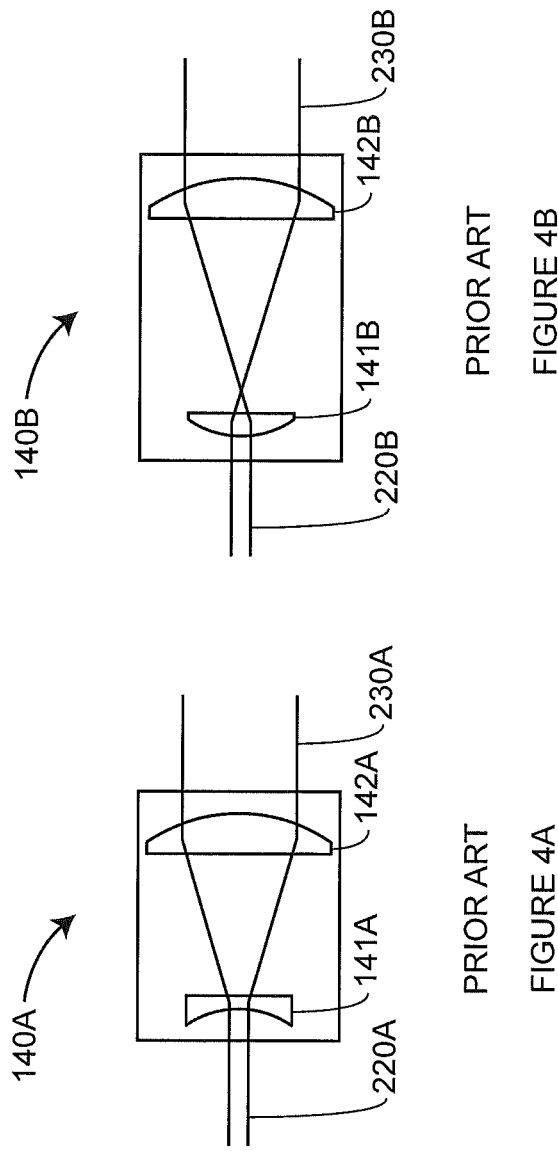
FIGS. 4A and 4B, shows two types of prior art afocal beam expanders.

Beam expander 140 may be set up using a variety of lens configurations, but two commonly used prior-art configurations are shown in FIGS. 4A, 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

The fiber network of FIG. 8A includes a first fiber coupler 430, a second fiber coupler 436, and low-transmission reflectors 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

Figure 5:
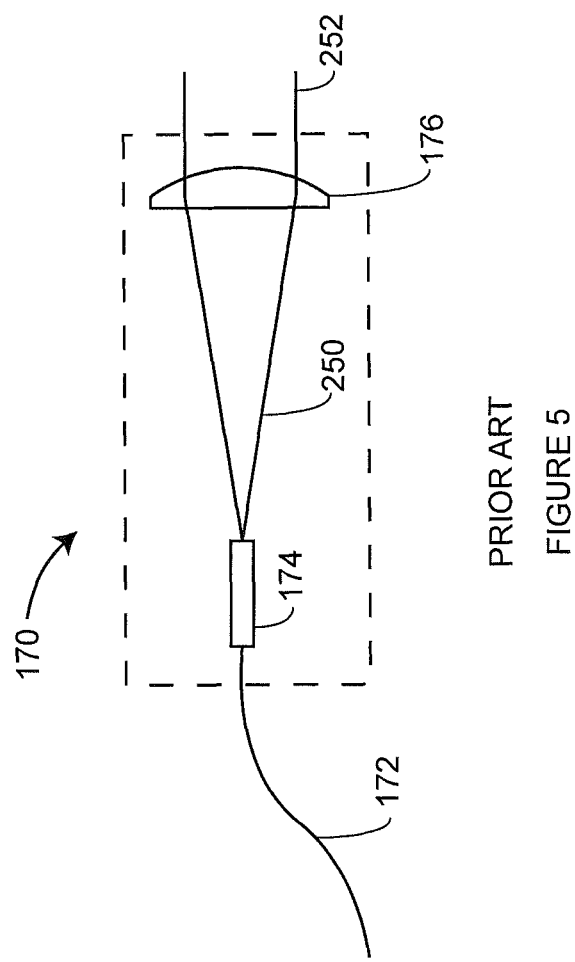
FIG. 5 shows a prior art fiber-optic beam launch.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in patent '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible laser 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7:
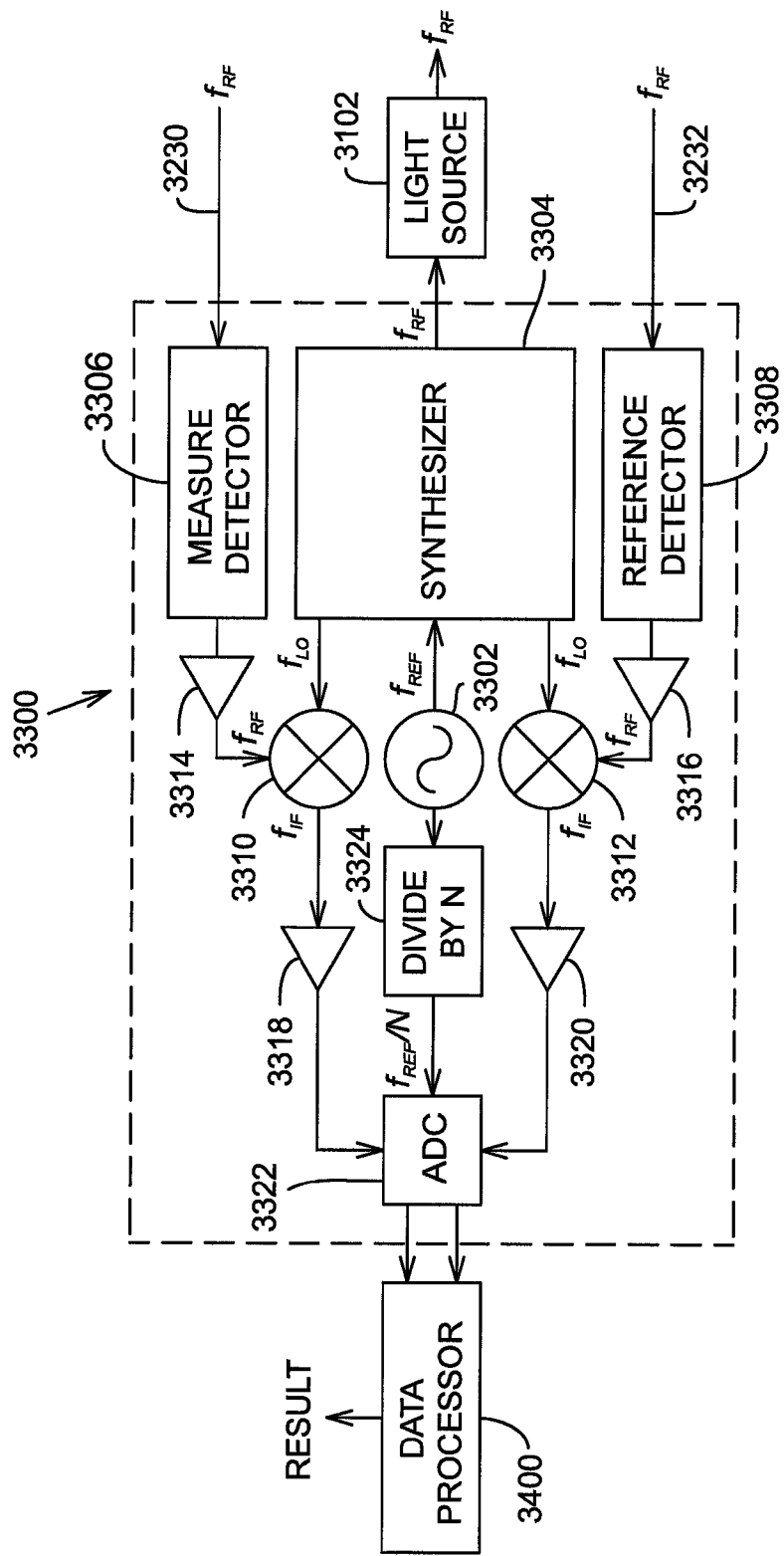
FIG. 7 is a block diagram of electrical and electro-optical elements within a prior art ADM.

The light from the fiber network 166 enters ADM electronics 164 through optical fibers 168, 169. An embodiment of prior art ADM electronics is shown in FIG. 7. Optical fiber 168 in FIG. 3 corresponds to optical fiber 3232 in FIG. 7, and optical fiber 169 in FIG. 3 corresponds to optical fiber 3230 in FIG. 7. Referring now to FIG. 7, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}-f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are herein incorporated by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer 120. It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Figure 6F:
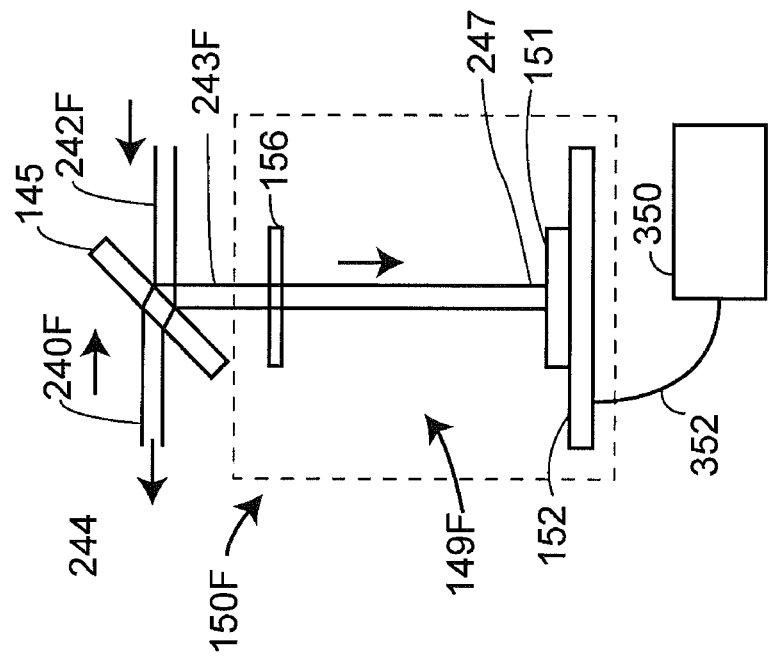
FIGS. 6E and 6F are schematic figures showing position detector assemblies according to embodiments of the present invention.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

Figure 6E:
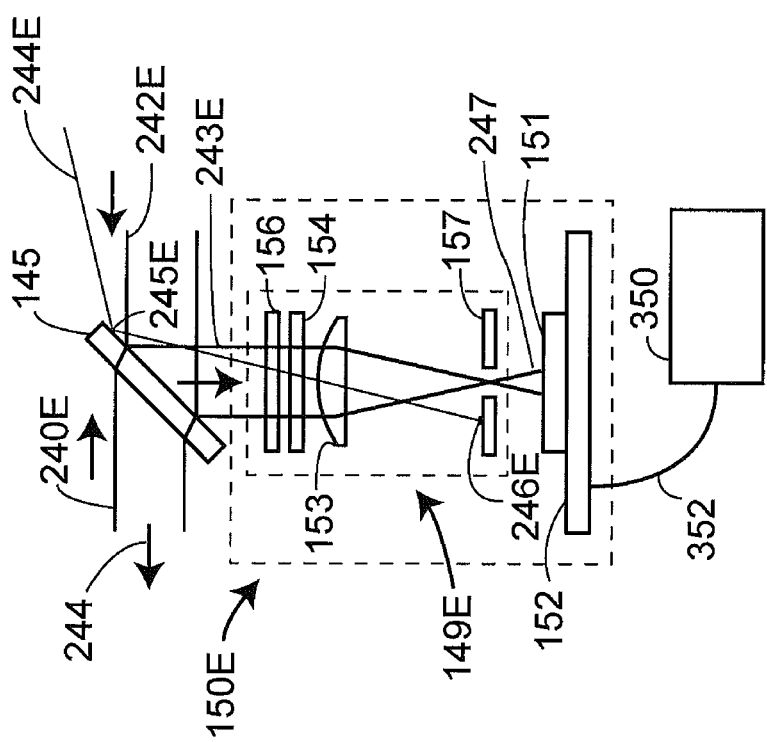

FIG. 6E shows a novel position detector assembly that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. Variations in a spot of light at a position detector may be particularly prominent from light reflected from cube corners in six-DOF targets, as may be understood more clearly from commonly assigned U.S. patent application Ser. Nos. 13/370,339 filed Feb. 10, 2012, and Ser. No. 13/407,983, filed Feb. 29, 2012, the contents of which are incorporated by reference. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
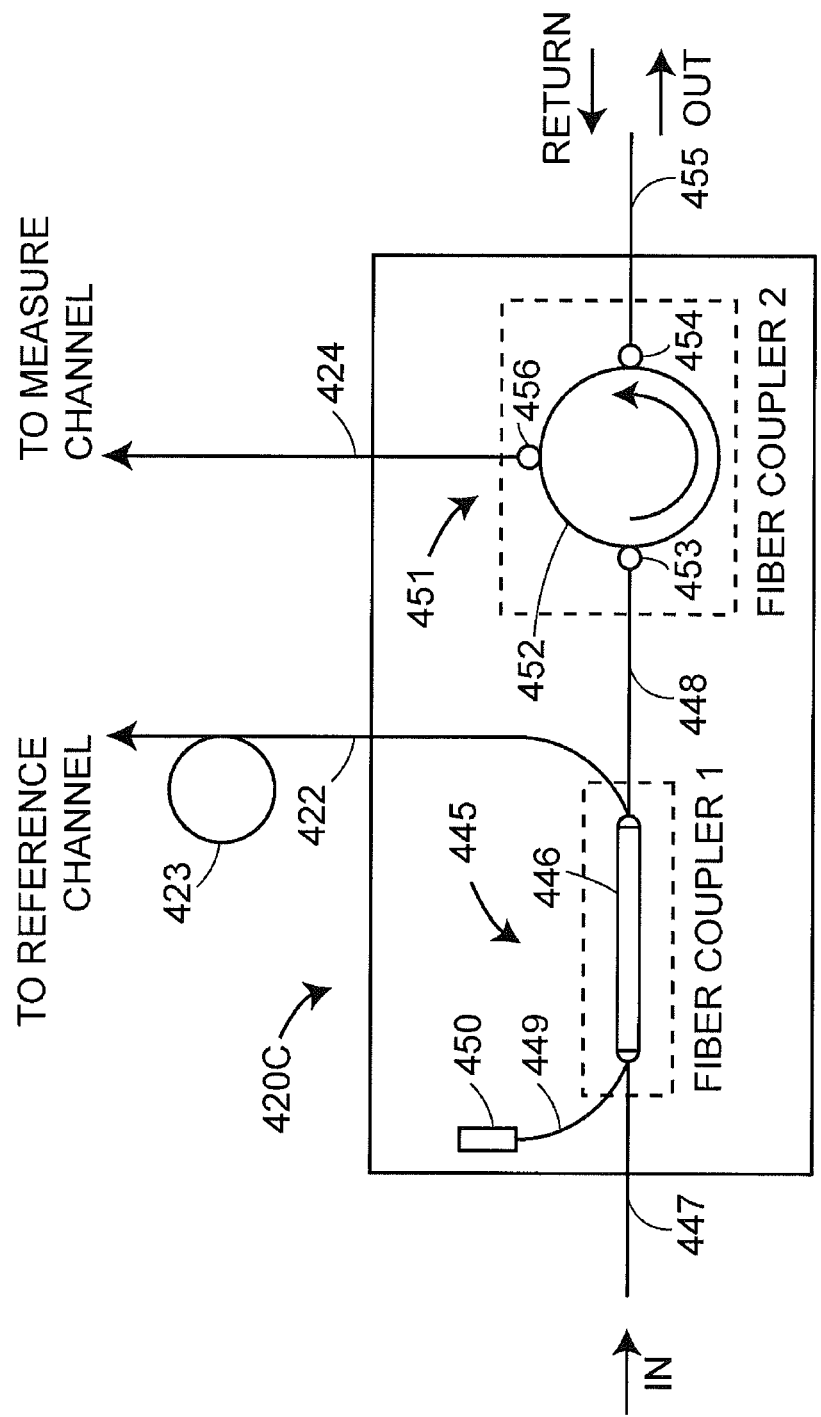
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 9:
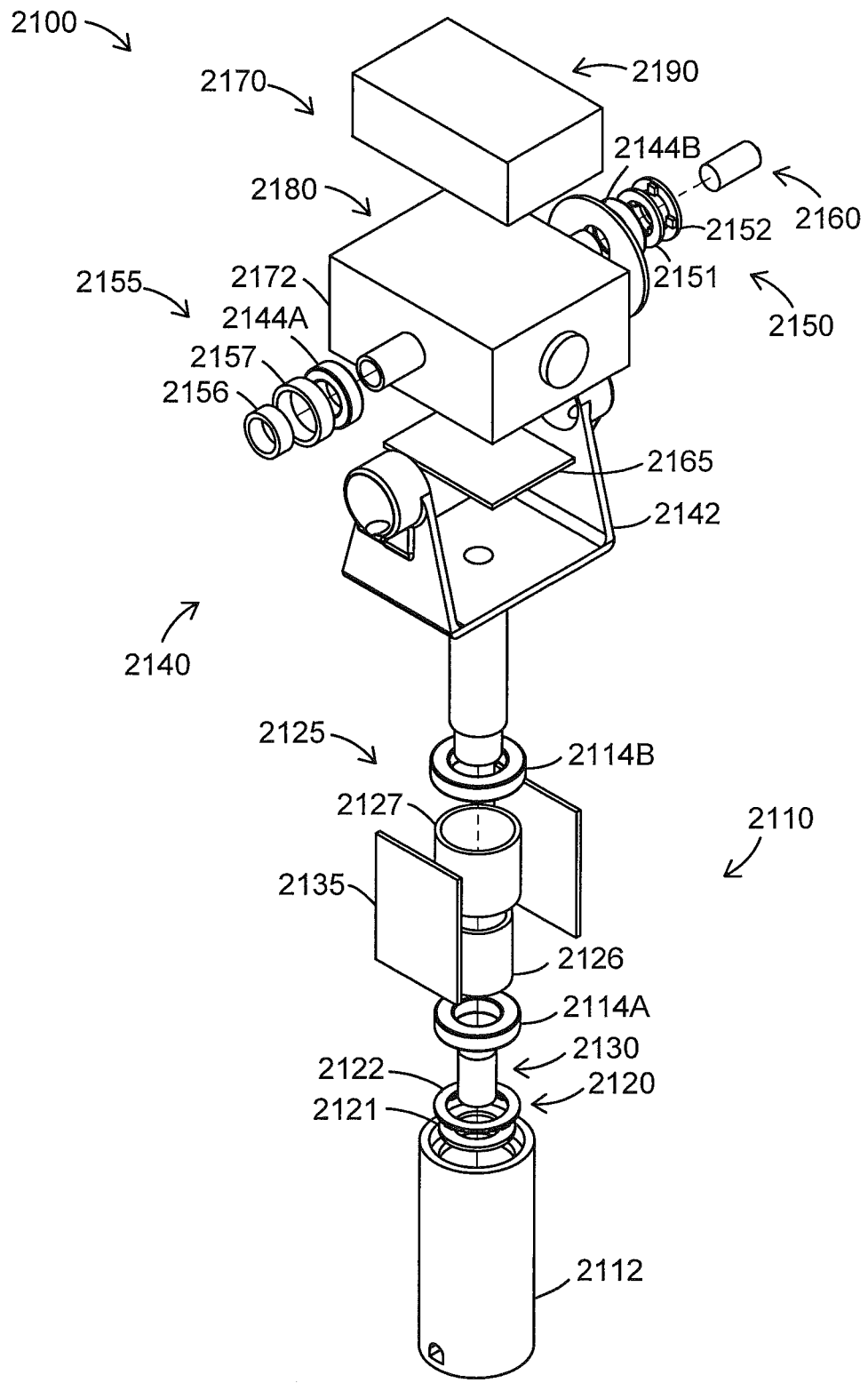
FIG. 9 is an exploded view of a prior art laser tracker.
Figure 10:
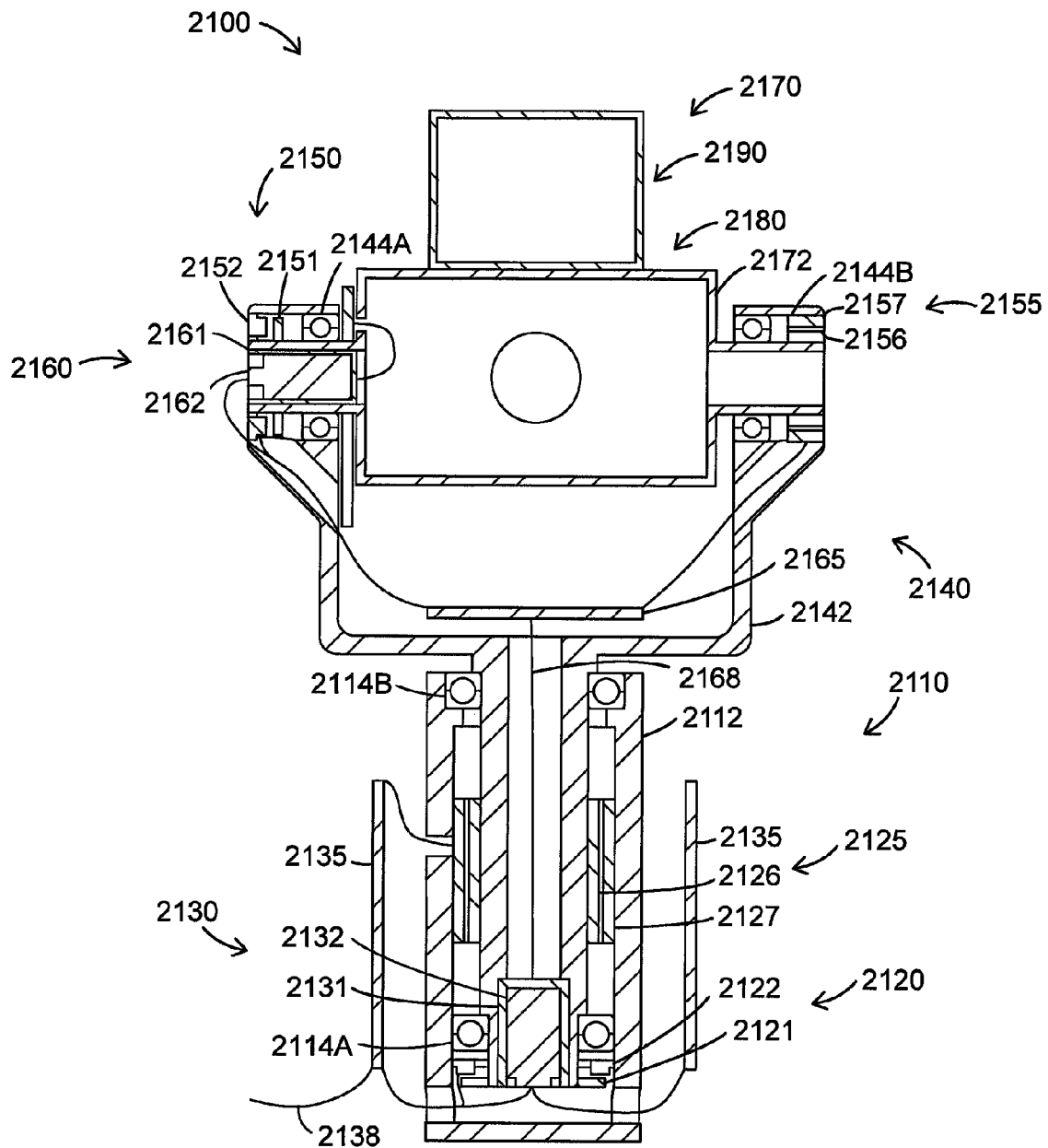
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of U.S. Published Patent Application No. 2010/0128259 to Bridges et al., incorporated by reference. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 10, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith read-head assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 30, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
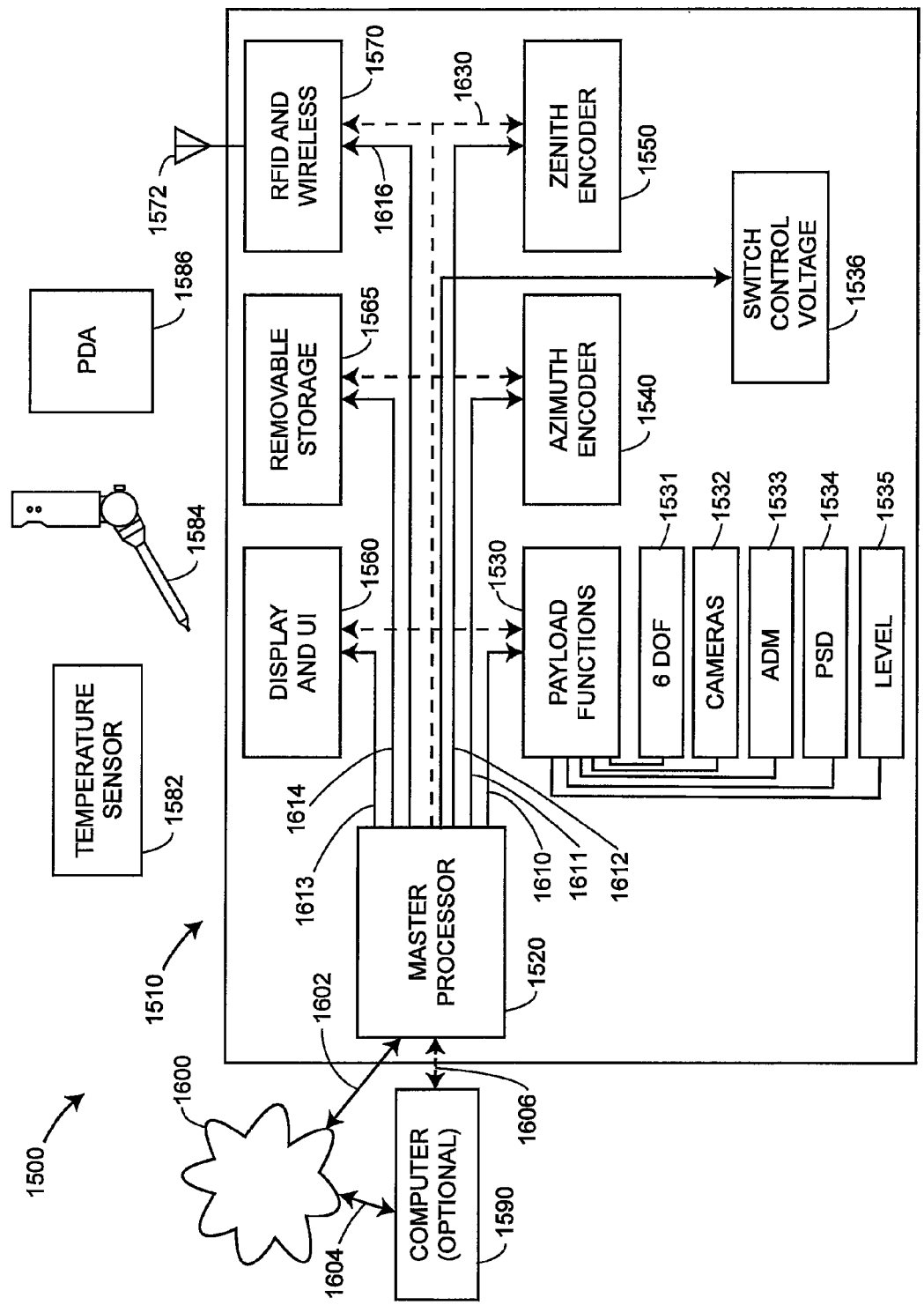
FIG. 11 is a block diagram of the computing and communication elements of a laser tracker according to an embodiment of the present invention.

FIG. 11 is a block diagram depicting a dimensional measurement electronics processing system 1500 that includes a laser tracker electronics processing system 1510, processing systems of peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9, 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584. Peripheral devices may contain processors. The six-DOF accessories may include six-DOF probing systems, six-DOF scanners, six-DOF projectors, six-DOF sensors, and six-DOF indicators. The processors in these six-DOF devices may be used in conjunction with processing devices in the laser tracker as well as an external computer and cloud processing resources. Generally, when the term laser tracker processor or measurement device processor is used, it is meant to include possible external computer and cloud support.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are separated from one another and from the payload electronics 1530 by the slip rings 2130, 2160 shown in FIGS. 9, 10. This is why the bus lines 1610, 1611, and 1612 are depicted as separate bus line in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, an Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Laser trackers today use one visible wavelength (usually red) and one infrared wavelength for the ADM. The red wavelength may be provided by a frequency stabilized helium-neon (HeNe) laser suitable for use in an interferometer and also for use in providing a red pointer beam. Alternatively, the red wavelength may be provided by a diode laser that serves just as a pointer beam. A disadvantage in using two light sources is the extra space and added cost required for the extra light sources, beam splitters, isolators, and other components. Another disadvantage in using two light sources is that it is difficult to perfectly align the two light beams along the entire paths the beams travel. This may result in a variety of problems including inability to simultaneously obtain good performance from different subsystems that operate at different wavelengths. A system that uses a single light source, thereby eliminating these disadvantages, is shown in opto-electronic system 500 of FIG. 12A.

Figure 12A:
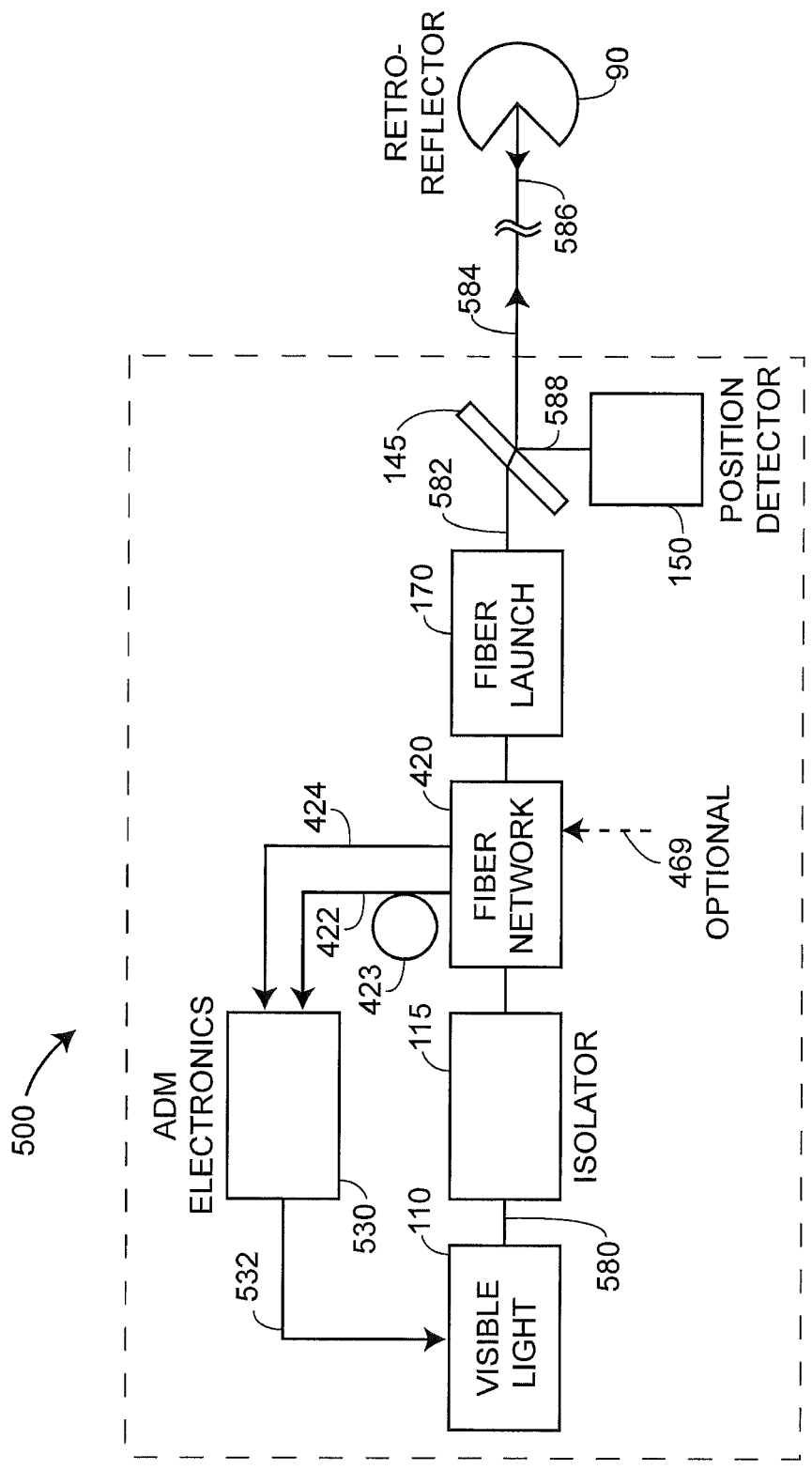
FIG. 12A is a block diagram of elements in a laser tracker that uses a single wavelength according to an embodiment of the present invention.

FIG. 12A includes a visible light source 110, an isolator 115, a fiber network 420, ADM electronics 530, a fiber launch 170, a beam splitter 145, and a position detector 150. The visible light source 110 might be, for example, a red or green diode laser or a vertical cavity surface emitting laser (VCSEL). The isolator might be a Faraday isolator, an attenuator, or any other device capable of sufficiently reducing the amount of light fed back into the light source. The light from the isolator 115 travels into the fiber network 420, which in an embodiment is the fiber network 420A of FIG. 8A.

Figure 12B:
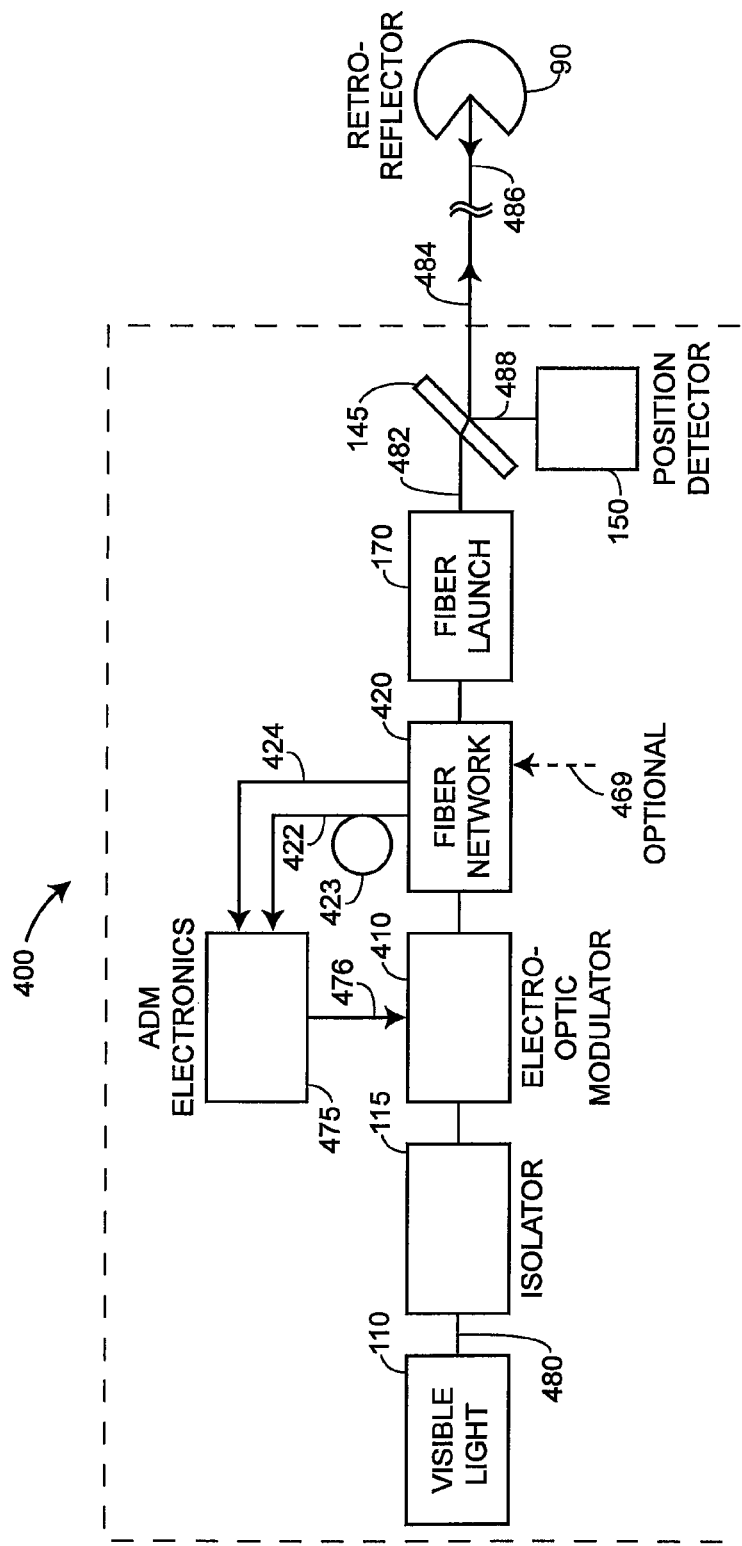
FIG. 12B is a block diagram of elements in a laser tracker that uses a single wavelength according to an embodiment of the present invention.

FIG. 12B shows an embodiment of an optoelectronic system 400 in which a single wavelength of light is used but wherein modulation is achieved by means of electro-optic modulation of the light rather than by direct modulation of a light source. The optoelectronic system 400 includes a visible light source 110, an isolator 115, an electrooptic modulator 410, ADM electronics 475, a fiber network 420, a fiber launch 170, a beam splitter 145, and a position detector 150. The visible light source 110 may be, for example, a red or green laser diode. Laser light is sent through an isolator 115, which may be a Faraday isolator or an attenuator, for example. The isolator 115 may be fiber coupled at its input and output ports. The isolator 115 sends the light to the electrooptic modulator 410, which modulates the light to a selected frequency, which may be up to 10 GHz or higher if desired. An electrical signal 476 from ADM electronics 475 drives the modulation in the electrooptic modulator 410. The modulated light from the electrooptic modulator 410 travels to the fiber network 420, which might be the fiber network 420A, 420B, 420C, or 420D discussed hereinabove. Some of the light travels over optical fiber 422 to the reference channel of the ADM electronics 475. Another portion of the light travels out of the tracker, reflects off retroreflector 90, returns to the tracker, and arrives at the beam splitter 145. A small amount of the light reflects off the beam splitter and travels to position detector 150, which has been discussed hereinabove with reference to FIGS. 6A-F. A portion of the light passes through the beam splitter 145 into the fiber launch 170, through the fiber network 420 into the optical fiber 424, and into the measure channel of the ADM electronics 475. In general, the system 500 of FIG. 12A can be manufactured for less money than system 400 of FIG. 12B; however, the electro-optic modulator 410 may be able to achieve a higher modulation frequency, which can be advantageous in some situations.

Figure 13:
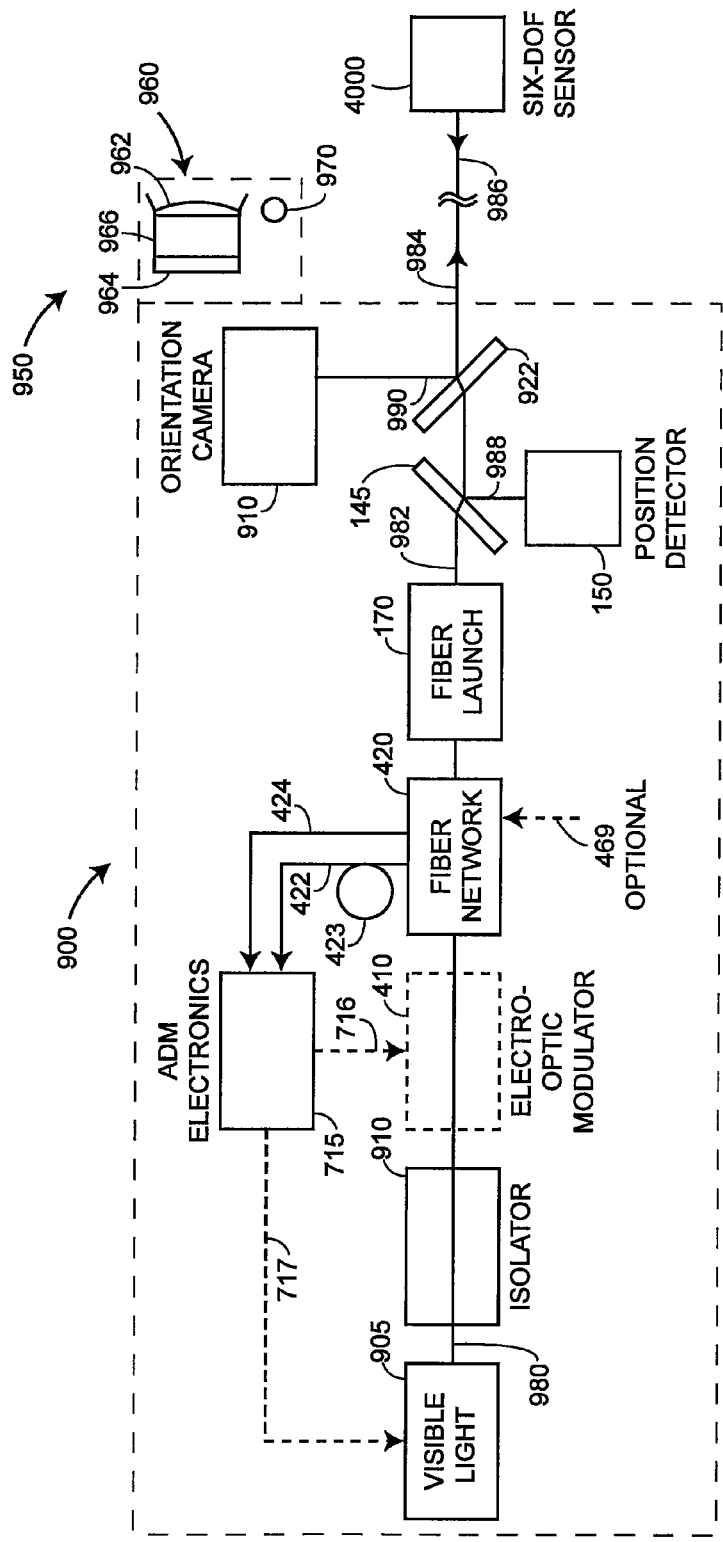
FIG. 13 is a block diagram of elements in a laser tracker with six-DOF capability according to an embodiment of the present invention.

FIG. 13 shows an embodiment of a locator camera system 950 and an optoelectronic system 900 in which an orientation camera 910 is combined with the optoelectronic functionality of a 3D laser tracker to measure six degrees of freedom. The optoelectronic system 900 includes a visible light source 905, an isolator 910, an optional electrooptic modulator 410, ADM electronics 715, a fiber network 420, a fiber launch 170, a beam splitter 145, a position detector 150, a beam splitter 922, and an orientation camera 910. The light from the visible light source is emitted in optical fiber 980 and travels through isolator 910, which may have optical fibers coupled on the input and output ports. The light may travel through the electrooptic modulator 410 modulated by an electrical signal 716 from the ADM electronics 715. Alternatively, the ADM electronics 715 may send an electrical signal over cable 717 to modulate the visible light source 905. Some of the light entering the fiber network travels through the fiber length equalizer 423 and the optical fiber 422 to enter the reference channel of the ADM electronics 715. An electrical signal 469 may optionally be applied to the fiber network 420 to provide a switching signal to a fiber optic switch within the fiber network 420. A part of the light travels from the fiber network to the fiber launch 170, which sends the light on the optical fiber into free space as light beam 982. A small amount of the light reflects off the beamsplitter 145 and is lost. A portion of the light passes through the beam splitter 145, through the beam splitter 922, and travels out of the tracker to six degree-of-freedom (DOF) device 4000. The six-DOF device 4000 may be a probe, a scanner, a projector, a sensor, or other device.

On its return path, the light from the six-DOF device 4000 enters the optoelectronic system 900 and arrives at beamsplitter 922. Part of the light is reflected off the beamsplitter 922 and enters the orientation camera 910. The orientation camera 910 records the positions of some marks placed on the retroreflector target. From these marks, the orientation angle (i.e., three degrees of freedom) of the six-DOF probe is found. The principles of the orientation camera are described hereinafter in the present application and also in patent '758. A portion of the light at beam splitter 145 travels through the beamsplitter and is put onto an optical fiber by the fiber launch 170. The light travels to fiber network 420. Part of this light travels to optical fiber 424, from which it enters the measure channel of the ADM electronics 715.

The locator camera system 950 includes a camera 960 and one or more light sources 970. The locator camera system is also shown in FIG. 1, where the cameras are elements 52 and the light sources are elements 54. The camera includes a lens system 962, a photosensitive array 964, and a body 966. One use of the locator camera system 950 is to locate retroreflector targets in the work volume. It does this by flashing the light source 970, which the camera picks up as a bright spot on the photosensitive array 964. A second use of the locator camera system 950 is establish a coarse orientation of the six-DOF device 4000 based on the observed location of a reflector spot or LED on the six-DOF device 4000. If two or more locator camera systems are available on the laser tracker, the direction to each retroreflector target in the work volume may be calculated using the principles of triangulation. If a single locator camera is located to pick up light reflected along the optical axis of the laser tracker, the direction to each retroreflector target may be found. If a single camera is located off the optical axis of the laser tracker, then approximate directions to the retroreflector targets may be immediately obtained from the image on the photosensitive array. In this case, a more accurate direction to a target may be found by rotating the mechanical axes of the laser to more than one direction and observing the change in the spot position on the photosensitive array.

FIGS. 14A, 14B show front and perspective views of an exemplary laser tracker having enhanced design features including narrow field-of-view (FOV) indicator lights 4116, wide FOV illuminated side panel 4140, asymmetric features 4112, 4114, touch sensitive buttons 4130, and retracting handle 4150. FIG. 14C shows a perspective view of an exemplary laser tracker with the retracting handle 4150 in the extended position. Also shown in FIGS. 14A-14C are finger slots 4168, posts 4152, side grips 4164A, 4164B, the side grips having side-grip indentations 4166, and a recessed grip 4160. An advantage of the retractable handle shown in FIGS. 14A-14C is that the tracker 4100, 4190 can be designed with a very stiff (thick) zenith carriage 14, while still enabling the use of a handle and while permitting the size of the tracker to be minimized for shipment in a shipping container. In an embodiment, the posts 4152 provide a frictional constraint that causes the retractable handle 4150 to remain in its current position, which is either an open position or a retracted position. The finger slots 4168 are configured to allow a user to insert fingers on either side of the retractable handle, thereby making it easier to apply force to move the retractable handle up or down. The retractable handle may be conveniently used in combination with the recessed grip 4160 to enable a user to make use of both hands in moving or positioning the tracker. In an embodiment, the retractable handle is sufficiently stiff to enable the tracker to be turned on its side, for example, for storage in or removal from an instrument case. The side grips permit a user to place hands on opposite sides of the tracker. The side grips are particularly convenient when transferring position of the tracker from one user to another user. The side grips may be made of an elastomeric material to provide improved gripping. The side grips may contain side-grip indentations to further improve gripping. For example, a first user may support the tracker with the retractable handle, while a second user grabs the tracker by the side grips. For the purposes of the present application, the term "top" refers to the side of the tracker having the retractable handle 4150, and the term "bottom" refers to the side of the tracker having the recessed grip 4160. These terms top and bottom refer to the most commonly used orientations for the laser tracker, although the tracker can be used on its side or even upside down.

The narrow FOV indicator lights 4116 can be identified, as seen in the front view, from left to right as lights one to six. In an embodiment, the two innermost lights—numbers three and four—are red and green. The red light is illuminated when a measurement is in process. The green light is illuminated with a steady glow when the light beam from the laser tracker is locked onto the target. The green light is illuminated and flashing when the laser tracker is not locked onto the target but the position detector is detecting the light beam. In an embodiment, the next two innermost lights—numbers two and five—are yellow, and the outermost lights—numbers one and six—are blue. The yellow and blue lights may be used for a variety of purposes—for example, to provide signals to the operator. The functionality of these lights may be made accessible to the user through a software development kit (SDK).

The narrow FOV lights enable the operator to see the LEDs at large distances—for example, at 80 meters from the tracker. Because of this large range and narrow FOV, an observer standing to the side of the laser tracker may be unable to see the indicator lights. To get around this problem, additional red and green indicator lights are located beneath a diffusely scattering side panel in the illuminated side panel 4140. For example, red and green lights may be placed to allow viewing from either side and even, at a reduced level, from the front or back of the laser tracker.

Two modes of operation of a laser tracker are frontsight and backsight modes. Frontsight mode is the normal mode of operation. Backsight mode is the mode obtained by starting in frontsight mode and then carrying out the following steps: (1) rotate the azimuth angle by 180 degrees and (2) rotate the zenith angle to reverse its sign (a vertical direction upward corresponds to zero degrees), thereby pointing the laser beam back in almost the original direction. In making measurements with laser trackers, it is often desirable to be able to quickly tell, from a distance, whether the laser tracker is in frontsight or backsight mode. The asymmetric features 4112 and 3914 are flipped upside down in backsight mode and help the operator tell which mode the laser tracker is in. In addition, in backsight mode, the indicator lights flip below the laser tracker output aperture, thereby providing the operator with a clear indicator of whether the laser tracker is in frontsight or backsight mode.

A few operations are frequently performed on a laser tracker. For example, a frequently performed operation is sending the laser tracker to the home position. This is done by causing the laser beam to go to an SMR—typically an SMR placed on one of the three magnetic nests 4120. Because the distance from these "home positions" to the gimbal point 22 of the laser tracker is known, performing a home operation provides a convenient way of resetting the distance reference on the ADM or IFM in a laser tracker. In some cases, the operator may want to quickly perform a home operation without returning to a computer to execute the home command. The touch sensitive buttons 4130 provide an easy way to do this. In an embodiment, when the operator touches one of the buttons 4130, the laser tracker sends the laser beam to the SMR directly above the button. The three magnetic nests 4120 may correspond to different size SMRs—for example, SMRs having diameters of 1.5 inches, ⅞ inch, and ½ inch. Hence the buttons below the magnetic nests also provide the ability to switch among SMRs. For example, an operator could easily switch from a 1.5 inch SMR to a ½ inch SMR by placing a ½ inch SMR in the appropriate magnetic nest and pressing the touch sensitive sensor beneath it. The touch sensors may be based on the use of capacitive sensors, which are available today for low cost. It is possible to make the touch sensitive buttons responsive to movements close to the buttons before actual physical contact is made. In other words, it is possible to use proximity sensors. Besides the examples of the uses of touch sensors given here, it is possible to use touch sensors to issue a wide variety of commands to the laser tracker.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A coordinate measurement device that sends a first beam of light to a remote target point, the target point returning a portion of the first beam as a second beam, the coordinate measurement device having a top side, a bottom side, and a weight, the measurement device comprising:
    a first motor and a second motor that together direct the first beam of light to a first direction, the first direction determined by a first angle of rotation about a first axis and a second angle of rotation about a second axis, the first angle of rotation produced by the first motor and the second angle of rotation produced by the second motor;
    a zenith carriage mounted on an azimuth base and having the second axis, wherein a thick portion of the zenith carriage extends across the top side, and wherein the second axis is rotatable about the first axis relative to the azimuth base;
    a first angle measuring device that measures the first angle of rotation and a second angle measuring device that measures the second angle of rotation;
    a distance meter that measures a first distance from the coordinate measurement device to the target point based at least in part on a first portion of the second beam received by a first optical detector;
    a processor that provides a three-dimensional coordinate of the target point, the three-dimensional coordinate based at least in part on the first distance, the first angle of rotation, and the second angle of rotation; and
    a retractable handle located at the top side, the retractable handle retractable into and out of the zenith carriage such that when the retractable handle is extended into an open position the thick portion of the zenith carriage remains extended across the top side to provide a stiff zenith carriage.

2. The coordinate measurement device of claim 1, wherein the retractable handle is configured to remain in a current position unless force is applied by a user, the current position being either an open position or a retracted position.

3. The coordinate measurement device of claim 1, further including a first finger slot and a second finger slot, the first finger slot and the second finger slot disposed in the thick portion of the zenith carriage proximal to the retractable handle, the first finger slot on a first side of the retractable handle and the second finger slot on a side of the retractable handle opposite the first side, the first finger slot and the second finger slot configured for gripping of the retractable handle by fingers of a user.

4. The coordinate measurement device of claim 1, further including a recessed grip on the bottom side, the recessed grip being an indentation large enough to permit fingers to be inserted into the indentation.

5. The coordinate measurement device of claim 4, wherein the retractable handle is configured to support the weight of the coordinate measurement device when the retractable handle is lowered to approximately the same level as the recessed grip.

6. The coordinate measurement device of claim 1, further including a side grip pair, the side grip pair including a first side grip and a second side grip, the first side grip located opposite the second side grip on a side of the coordinate measurement device, the first side grip and the second side grip being located at positions intermediate between the top side and the bottom side, the side grip pair configured to be gripped by a pair of hands.

7. The coordinate measurement device of claim 4, further including a side grip pair, the side grip pair including a first side grip and a second side grip, the first side grip located opposite the second side grip on a side of the coordinate measurement device, the first side grip and the second side grip being located at positions intermediate between the top side and the bottom side, the side grip pair configured to be gripped by a pair of hands.

8. A coordinate measurement device that sends a first beam of light to a remote target point, the target point returning a portion of the first beam as a second beam, the coordinate measurement device having a top side and a bottom side, the measurement device comprising:
- a first motor and a second motor that together direct the first beam of light to a first direction, the first direction determined by a first angle of rotation about a first axis and a second angle of rotation about a second axis, the first angle of rotation produced by the first motor and the second angle of rotation produced by the second motor;
- a zenith carriage mounted on an azimuth base, the zenith carriage having the second axis and being rotatable about the first axis relative to the azimuth base, wherein the second axis and the first axis intersect orthogonally and internally to the measurement device at a gimbal point;
- a first angle measuring device that measures the first angle of rotation and a second angle measuring device that measures the second angle of rotation;
- a distance meter that measures a first distance from the coordinate measurement device to the target point based at least in part on a first portion of the second beam received by a first optical detector;
- a processor that provides a three-dimensional coordinate of the target point, the three-dimensional coordinate based at least in part on the first distance, the first angle of rotation, and the second angle of rotation; and
- a recessed grip disposed on the azimuth base on the bottom side, the recessed grip being an indentation large enough to permit fingers to be inserted into the indentation.

9. The coordinate measurement device of claim 8, further including a retractable handle located at the top.

10. The coordinate measurement device of claim 8, further including a side grip pair, the side grip pair including a first side grip and a second side grip, the first side grip located opposite the second side grip on a side of the coordinate measurement device, the first side grip and the second side grip being located at positions intermediate between the top side and the bottom side, the side grip pair configured to be gripped by a pair of hands.

11. The coordinate measurement device of claim 9, further including a side grip pair, the side grip pair including a first side grip and a second side grip, the first side grip located opposite the second side grip on a side of the coordinate measurement device, the first side grip and the second side grip being located at positions intermediate between the top side and the bottom side, the side grip pair configured to be gripped by a pair of hands.

12. A coordinate measurement device that sends a first beam of light to a remote target point, the target point returning a portion of the first beam as a second beam, the coordinate measurement device having a top side and a bottom side, the measurement device comprising:
- a first motor and a second motor that together direct the first beam of light to a first direction, the first direction determined by a first angle of rotation about a first axis and a second angle of rotation about a second axis, the first angle of rotation produced by the first motor and the second angle of rotation produced by the second motor;
- a zenith carriage mounted on an azimuth base, the zenith carriage having the second axis and being rotatable about the first axis;
- a first angle measuring device that measures the first angle of rotation and a second angle measuring device that measures the second angle of rotation;
- a distance meter that measures a first distance from the coordinate measurement device to the target point based at least in part on a first portion of the second beam received by a first optical detector;
- a processor that provides a three-dimensional coordinate of the target point, the three-dimensional coordinate based at least in part on the first distance, the first angle of rotation, and the second angle of rotation; and
- a side grip pair disposed on the zenith carriage off the second axis between the second axis and the azimuth base, the side grip pair including a first side grip and a second side grip, the first side grip located opposite the second side grip on a side of the coordinate measurement device, the first side grip and the second side grip being located at positions intermediate between the top side and the bottom side, the side grip pair configured to be gripped by a pair of hands.

13. The coordinate measurement device of claim 12, wherein the first side grip and the second side grip include side-grip indentations.

14. The coordinate measurement device of claim 12, wherein the first side grip and the second side grip are made of an elastomeric material.

15. The coordinate measurement device of claim 12, further including a retractable handle located at the top.

16. The coordinate measurement device of claim 12, further including a recessed grip on the bottom side, the recessed grip being an indentation large enough to permit fingers to be inserted into the indentation.

17. The coordinate measurement device of claim 15, further including a recessed grip on the bottom side, the recessed grip being an indentation large enough to permit fingers to be inserted into the indentation.

18. A coordinate measurement device that sends a first beam of light to a remote target point, the target point returning a portion of the first beam as a second beam, the coordinate measurement device having a top side, a bottom side, and a weight, the measurement device comprising:
- a first motor and a second motor that together direct the first beam of light to a first direction, the first direction determined by a first angle of rotation about a first axis and a second angle of rotation about a second axis, the first angle of rotation produced by the first motor and the second angle of rotation produced by the second motor;
- a zenith carriage mounted on an azimuth base and having the second axis, wherein a thick portion of the zenith carriage extends across the top side, and wherein the second axis is rotatable about the first axis relative to the azimuth base;
- a first angle measuring device that measures the first angle of rotation and a second angle measuring device that measures the second angle of rotation;

a processor that provides a three-dimensional coordinate of the target point, the three-dimensional coordinate based at least in part on the first distance, the first angle of rotation, and the second angle of rotation; and a retractable handle located at the top side, the retractable handle retractable into and out of the zenith carriage such that when the retractable handle is extended into an open position the thick portion of the zenith carriage remains extended across the top side to provide a stiff zenith carriage.

* * * * *